No. 663,110. Patented Dec. 4, 1900.
B. VAUGHN.
AIR BRAKE COUPLING.
(Application filed Feb. 10, 1900.)
(No Model.)
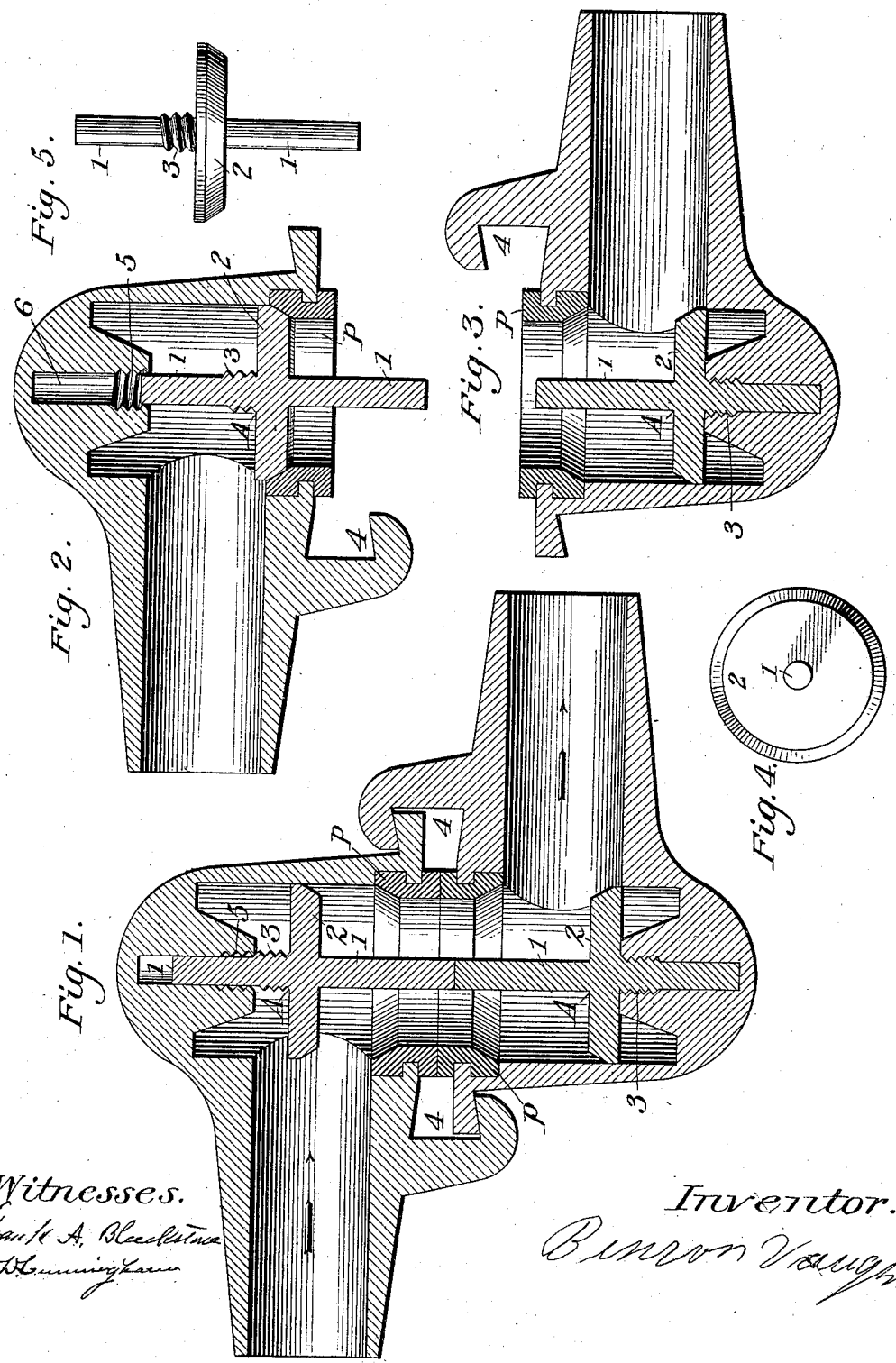
Witnesses.
Inventor.

UNITED STATES PATENT OFFICE.

BENSON VAUGHN, OF NEW CASTLE, PENNSYLVANIA.

AIR-BRAKE COUPLING.

SPECIFICATION forming part of Letters Patent No. 663,110, dated December 4, 1900.

Application filed February 10, 1900. Serial No. 4,837. (No model.)

*To all whom it may concern:*

Be it known that I, BENSON VAUGHN, a citizen of the United States, residing in the city of New Castle, in the county of Lawrence and State of Pennsylvania, have invented an Automatic Air-Brake Coupling, of which the following is a specification.

My invention consists in a device by which in the event of the cars breaking away or becoming separated and the air brake or hose being pulled apart the air in the pipe or hose attached to the detached or rear car will escape, and thus cause the brakes to act and at once stop the car or cars that have broken loose, while the end of the hose or pipe from which the car has broken away is instantly closed, leaving that part of the train next the engine entirely under the control of the engineer.

My invention is fully illustrated by the accompanying drawings.

Figure 1 is a vertical section with the couplers connected. Fig. 2 is a vertical section of one coupler, showing the valve closed. Fig. 3 is a similar section of the other coupler, showing the valve held open. Fig. 4 is a front view of the valve detached from the coupler. Fig. 5 is a side view of the same.

The arrow represents the course of the air passing from the pump or engine through the coupling from the front to the rear section.

A represents two valves, one at the end of each section, attached to the coupling. These valves are adjustable and may be fastened to the proper part of the coupling by a screw or other device.

1 represents two pins or spurs attached to the valves. They serve to keep the valves apart. When the sections are coupled, the valve belonging to the rear section is fastened back. The one belonging to the front section is open, but held back by the pins. The air passes through between the valves.

3 represents screw-threads formed on the rearwardly-projecting portion of pin 1. These threads are designed to engage threads 5, found near the outer end of recess 6, and thus hold the valve 2 open.

P is a suitable packing forming a valve-seat.

In the event of the sections pulling apart the valve belonging to the front section is at once released and closes upon the packing on the sides at P P, thus effectually closing the end of the pipe or hose and leaving the cars connected with the engine under the control of the engineer, while the valve belonging to the section pulled away is held fast, thus causing the hose to remain open and the air to escape from the rear section, and thus setting the brakes and stopping the car or cars that break loose from the engine.

What I claim is—

1. In a train-pipe coupler, a valve adapted to close the port in said coupler and having a rearwardly-extending stem said stem having a screw-threaded portion adapted to engage a threaded recess in the rear of the coupler, whereby said valve may be held open, substantially as described.

2. In a train-pipe coupler a valve adapted to close the port in said coupler and having a forwardly-extending stem adapted to engage a similar stem on the valve in the other coupler: said valve having also a rearwardly-extending stem having a screw-threaded portion adapted to engage a threaded recess in the rear of the coupler, whereby said valve may be held open, substantially as described.

BENSON VAUGHN.

Witnesses:
H. C. ADAMS,
HENRY NIECE.